(12) United States Patent
Cho (10) Patent No.: US 11,187,553 B2
(45) Date of Patent: Nov. 30, 2021

(54) IN-VEHICLE INFORMATION DISPLAY APPARATUS AND METHOD OF CONTROLLING THE SAME

(71) Applicants: Hyundai Motor Company, Seoul (KR); Kia Motors Corporation, Seoul (KR)

(72) Inventor: Sung Tae Cho, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 228 days.

(21) Appl. No.: 16/664,004

(22) Filed: Oct. 25, 2019

(65) Prior Publication Data
US 2020/0355512 A1  Nov. 12, 2020

(30) Foreign Application Priority Data

May 7, 2019 (KR) .................. 10-2019-0052735

(51) Int. Cl.
*G01C 21/36* (2006.01)
*G01C 21/26* (2006.01)

(52) U.S. Cl.
CPC ......... *G01C 21/365* (2013.01); *G01C 21/265* (2013.01)

(58) Field of Classification Search
CPC ...... G01C 21/365; G01C 21/265; B60R 1/00; B60R 16/023; B60K 35/00; G09F 19/18

USPC ............................................. 701/431
See application file for complete search history.

(56) References Cited

U.S. PATENT DOCUMENTS

| 2015/0042751 A1* | 2/2015 | Leary ............... G03B 29/00 348/36 |
| 2015/0042959 A1* | 2/2015 | Leary ............... B60K 35/00 353/13 |
| 2015/0045097 A1* | 2/2015 | Ignomirello ........ B60R 11/0241 455/575.9 |

\* cited by examiner

*Primary Examiner* — Paula L Schneider
(74) *Attorney, Agent, or Firm* — Mintz Levin Cohn Ferris Glovsky and Popeo, P.C.; Peter F. Corless (57) ABSTRACT

An in-vehicle information display apparatus and a method of controlling the same output outputting various pieces of information using image output devices disposed on a rear surface of a protrusion type information display apparatus. The protrusion type information display apparatus applied to a vehicle includes an output region determination unit configured to, upon detecting that an event occurs, determine an image corresponding to the event and an output region, among a plurality of regions of a windshield, a screen correction unit configured to correct the determined image to match the determined output region, and a projector unit disposed on a rear surface opposite to a front surface on which a display is disposed and configured to project the corrected image onto the determined output region.

15 Claims, 7 Drawing Sheets

FIG. 1

RELATED ART

IN-VEHICLE INFORMATION DISPLAY APPARATUS AND METHOD OF CONTROLLING THE SAME

This application claims under 35 U.S.C. § 119(a) the benefit of Korean Patent Application No. 10-2019-0052735, filed on May 7, 2019, which is incorporated by reference herein.

BACKGROUND

(a) Technical Field

The present disclosure relates to an in-vehicle information display apparatus and a method of controlling the same for outputting various pieces of information using image output devices disposed on a rear surface of a protrusion type information display apparatus.

(b) Description of the Related Art

In general, an information display apparatus for visually outputting various pieces of information is installed in the vicinity of a dashboard of a vehicle. A representative example of such an information display apparatus is an audio/video/navigation (AVN) system. The arrangement of the AVN system will be described with reference to FIG. 1.

Figure 1:
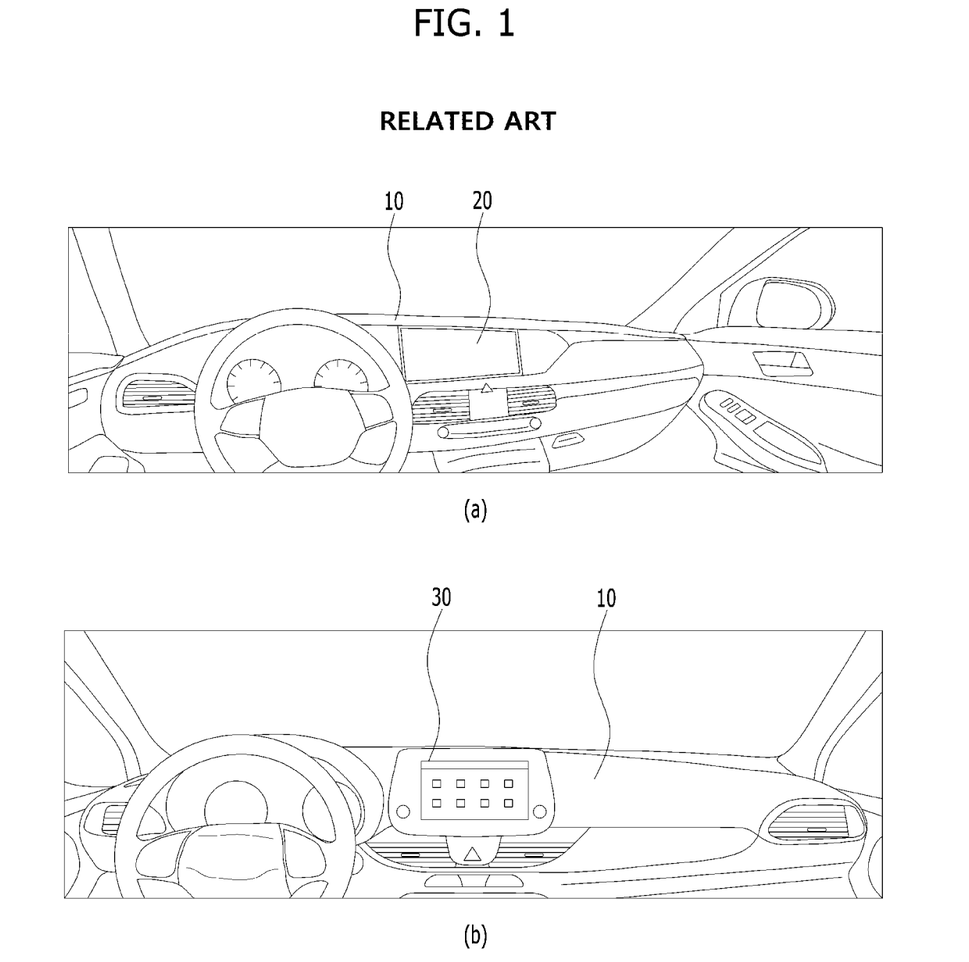
FIG. 1 (RELATED ART) is a diagram for explanation of arrangement of an audio/video/navigation (AVN) system.

FIG. 1 (RELATED ART) is a diagram for explanation of arrangement of an AVN system.

First, referring to FIG. 1 (a), an AVN system 20 may be embedded below a dashboard 10. Alternatively, referring to FIG. 1 (b), an AVN system 30 may also protrude out of the dashboard 10.

Generally, a structure illustrated in FIG. 1 (a) may be referred to as an embeddable type AVN system 20, and a structure illustrated in FIG. 1 (b) may be referred to as a protrusion type AVN system 30.

However, although a display and various command input devices are disposed on a front surface of the general protrusion type AVN system 30, a rear surface thereof has not been used because a user's hands and gaze do not reach the rear surface.

SUMMARY

An object of the present disclosure is to provide an in-vehicle information display apparatus and a method of controlling the same that more effectively use a rear surface of a protrusion type information display apparatus.

In particular, an object of the present disclosure is to provide an in-vehicle information display apparatus and a method of controlling the same for outputting various pieces of information appropriate for a situation using an information display device disposed on a rear surface of a protrusion type information display apparatus.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an in-vehicle information display apparatus includes, upon detecting that an event occurs, determining an image corresponding to the event and an output region, among a plurality of regions of a windshield, correcting the determined image to match the determined output region, and projecting the corrected image onto the determined output region through a projection unit disposed on a rear surface opposite to a front surface on which a display of a protrusion type information display apparatus is disposed.

In another aspect of the present disclosure, a protrusion type information display apparatus applied to a vehicle includes an output region determination unit configured to, upon detecting that an event occurs, determine an image corresponding to the event and an output region, among a plurality of regions of a windshield, a screen correction unit configured to correct the determined image to match the determined output region, and a projector unit disposed on a rear surface opposite to a front surface on which a display is disposed and configured to project the corrected image onto the determined output region.

In a further aspect of the present disclosure, a non-transitory computer readable recording medium containing program instructions executed by a processor can include: program instructions that, upon detecting that an event occurs, determine an image corresponding to the event and an output region, among a plurality of regions of a windshield; program instructions that correct the determined image to match the determined output region; and program instructions that project the corrected image onto the determined output region through a projection unit disposed on a rear surface opposite to a front surface on which a display of a protrusion type information display apparatus is disposed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

According to a proposal of an embodiment of the present disclosure, a projector may be disposed on a rear surface of a protrusion type AVN system, and accordingly an image appropriate for a situation may be projected onto a windshield.

Figure 2:
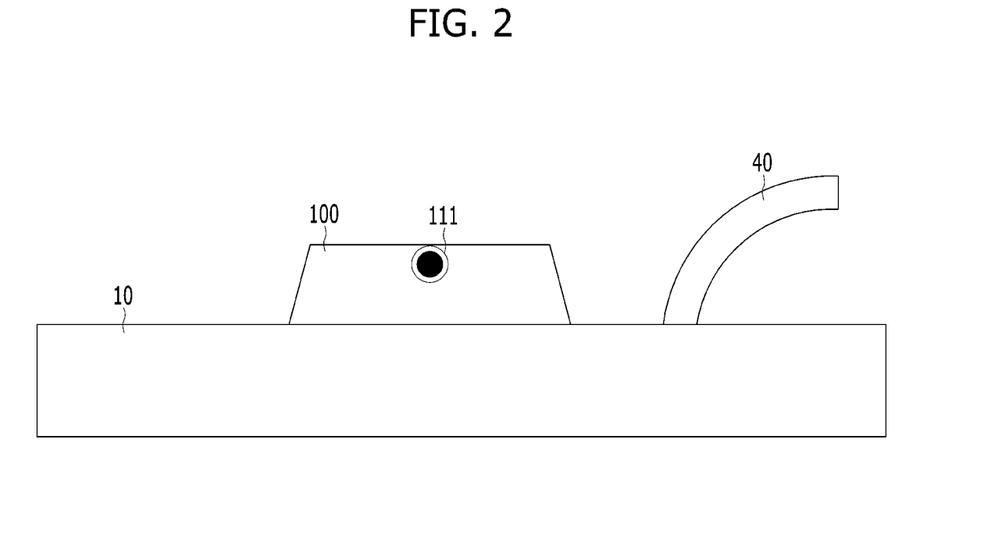
FIG. 2 is a schematic diagram for explanation of arrangement in which a projector unit is disposed on an AVN system according to an embodiment of the present disclosure.

FIG. 2 is a schematic diagram for explanation of arrangement in which a projector unit is disposed on an audio/video/navigation (AVN) system according to an embodiment of the present disclosure.

FIG. 2 illustrates a region around a vehicle dashboard 10 viewed from the front of a vehicle. Viewed from the front, a rear surface of a protrusion type AVN system 100 protrudes above the dashboard 10, and a steering wheel 40 is disposed to the dashboard of the AVN system based on what is generally referred to as a 'right hand drive vehicle'. As shown in FIG. 2, a projector output unit 111, which is in charge of projection of an image by the projection unit mentioned in the present embodiment, may be disposed on a region of a rear surface of the AVN system 100. Here, the rear surface of the AVN system 100 may be a surface opposite to a front surface including a display disposed thereon, which corresponds to a direction faced by a passenger, viewed from the inside of the vehicle, that is, a surface facing the front of the vehicle.

FIG. 2 illustrates an arrangement in which the projector output unit 111 is disposed on a central region of an upper end portion of the rear surface of the AVN system 100, but this is exemplary, and the present disclosure is not limited thereto.

Figure 3:
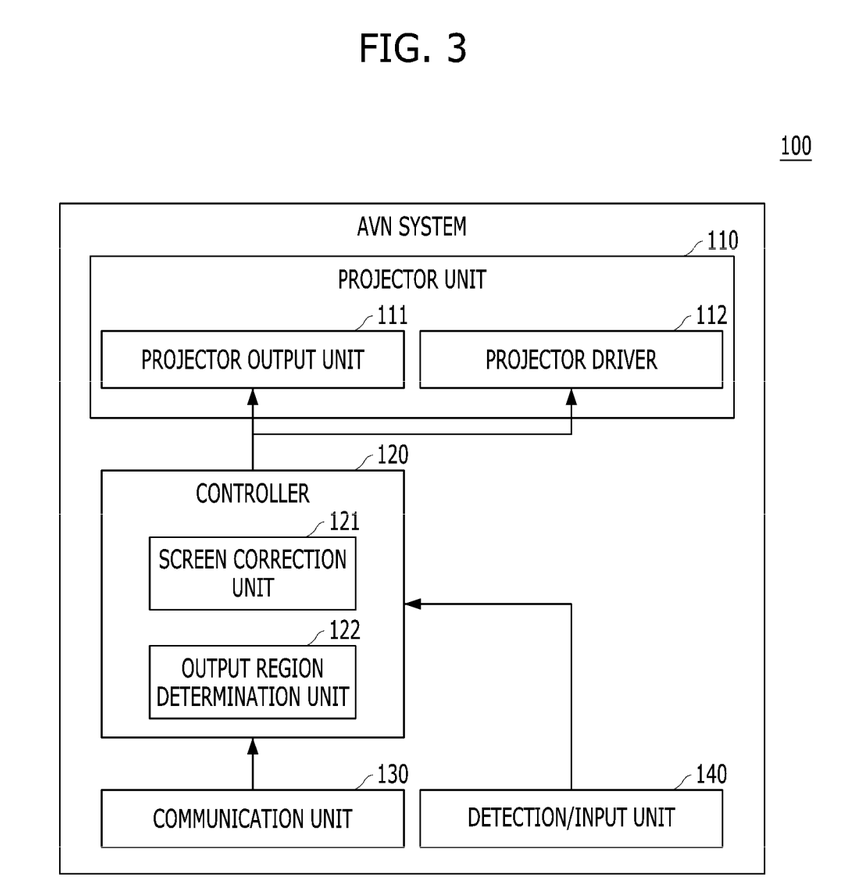
FIG. 3 is a block diagram showing an example of a configuration of an AVN system according to an embodiment of the present disclosure.

FIG. 3 is a block diagram showing an example of a configuration of an AVN system according to an embodiment of the present disclosure.

Referring to FIG. 3, the AVN system 100 according to an embodiment may include a projector unit 110 configured to project an image on a windshield, a controller 120 configured to perform overall control of the AVN system, which includes control of the projector unit 110, a communication unit 130 configured to exchange data with at least other components inside a vehicle, and a detection/input unit 140 configured to detect movement of a passenger or to receive a command. Hereinafter, each of the components will be described.

First, the projector unit 110 may include the projector output unit 111 and a projector driver 112. The projector output unit 111 may project content of other external components such as the AVN system 100, a cluster, or other controllers to a windshield. The projector output unit 111 may include at least one of a light source, a transparent display, or a lens in order to configure an image projection device. The projector output unit 111 may be configured with a single image projection device, or may alternatively be configured with a plurality of image projection devices. When the projector output unit 111 is configured with a plurality of image projection devices, the image projection devices may be directed in different directions, which will be described in more detail with reference to FIG. 4.

The projector driver 112 may change a direction toward which the projector output unit 111 is directed, along at least one axis. To this end, the projector driver 112 may include at least one actuator. When the projector output unit 111 includes the plurality of image projection devices, the projector driver 112 may be disposed with respect to each of the plurality of image projection devices, or may be disposed with respect to some of the image projection devices. Needless to say, in some embodiments, the projector driver 112 may be omitted. When an output region to be described below is determined, the projector driver 112 may rotate an image projection device in charge of a corresponding output region in such a way that the corresponding image projection device faces the output region, among one or multiple image projection devices.

The controller 120 may include a screen correction unit 121 and an output region determination unit 122. The screen correction unit 121 may correct an image to be projected by the projector output unit 111 in order to provide an image that is not distorted from the point of view of the passenger according to driving of the projector driver 112, an angle of basic orientation of the projector output unit 111, curves of a windshield disposed at a side corresponding to a direction in which the projector output unit 111 projects an image, or an angle and a distance between the projector output unit 111 and the windshield.

The output region determination unit 122 may determine a region of the windshield on which to display information corresponding to an event that has occurred, and accordingly may control the projector driver 112 to project an image to the determined region from the projector output unit 111. The output region determination unit 122 may provide information indicating the determined region to the screen correction unit 121. Thus, the screen correction unit 121 may determine the form of image correction based on the information indicating the determined region. Here, the screen correction unit 121 may correct an image in real time or may refer to a reference table in which correction values for respective positions are predefined in consideration of at least one of a type of an image to be output, a position of the determined region, or information on a degree of curvature at each position of the windshield during image correction corresponding to a region.

The communication unit 130 may perform vehicle communication with other components in the vehicle. For example, the communication unit 130 may acquire an image captured by a camera disposed on an advanced driver assistance system (ADAS), a camera monitor system (CMS) that assists or replaces a side view mirror, or the like or may acquire various pieces of sensor information, a determination result value of other controllers (e.g., whether a dangerous object approaches, or information on a detected forward vehicle/pedestrian) or the like, but this is exemplary, and the present disclosure is not limited thereto.

The detection/input unit 140 may detect a driver behavior/gesture or may receive a command. To this end, the detection/input unit 140 may include at least one of an ultrasonic sensor, a key button, a touch sensor, or a dial.

Figure 4:
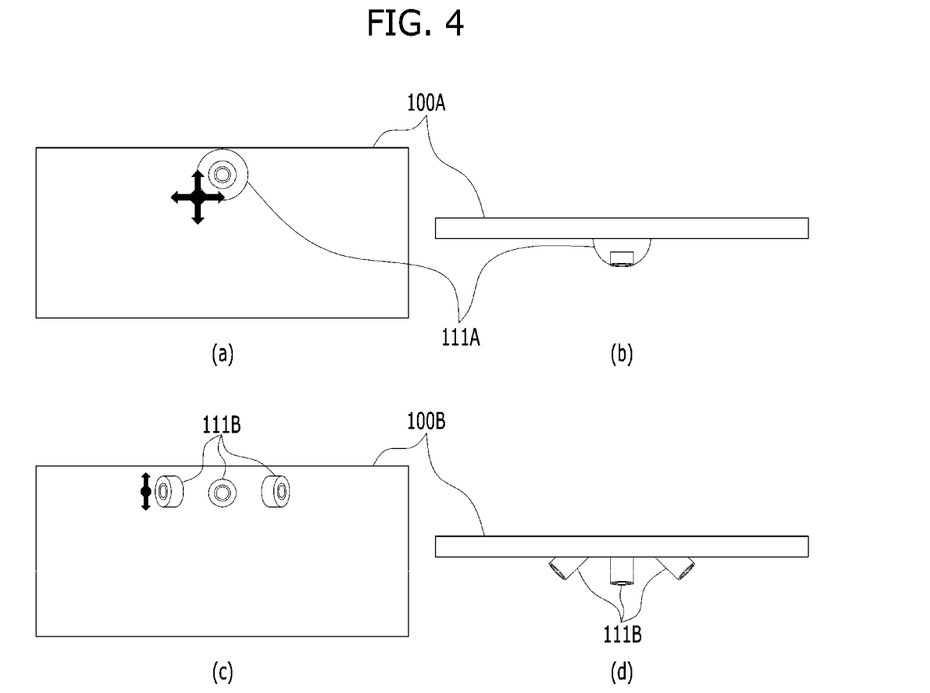
FIG. 4 is a diagram showing examples of a configuration of a projector unit according to an embodiment of the present disclosure.

FIG. 4 is a diagram showing examples of a configuration of a projector unit according to an embodiment of the present disclosure.

First, an AVN system 100A illustrated in FIGS. 4 (*a*) and 4 (*b*) may include one image projection device 111A as the projector output unit 111. In the case of this configuration, the corresponding image projection device 111A may be rotated in upward, downward, right, and left directions to change a projection direction along at least two axes.

In contrast, an AVN system 100B illustrated in FIGS. 4 (*c*) and 4 (*d*) may include three image projection devices 111B as the projector output unit 111. The horizontal angles at which the image projection devices 111B are respectively directed may be different from each other, in which case the image projection devices 111B may be independently rotated in at least a vertical direction.

This configuration is exemplary, and the present disclosure is not limited thereto. For example, even in the case of the configuration illustrated in FIGS. 4 (*c*) and 4 (*d*), the separate image projection devices 111B may also be rotated in a horizontal direction.

Figure 5:
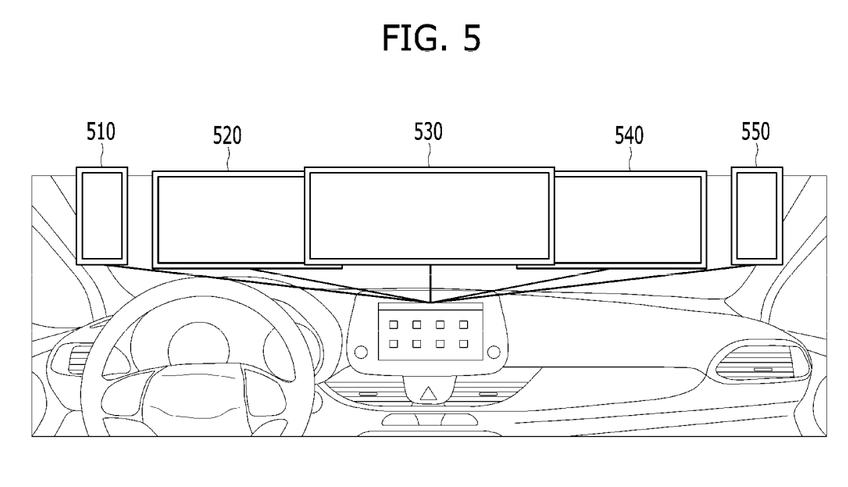
FIG. 5 is a diagram for explanation of output regions according to an embodiment of the present disclosure.

FIG. 5 is a diagram for explanation of output regions according to an embodiment of the present disclosure.

Referring to FIG. 5, the projector unit 110 according to an embodiment may project an image to at least one of a plurality of output regions. The output region may refer to a region of a windshield on which the image projected from the projector unit 110 is displayed. As illustrated in FIG. 5, the output region may include a driver seat edge region 510, a driver seat front region 520, a central region 530, a front passenger seat front region 540, and a front passenger seat edge region 550, but this is exemplary, and the present disclosure is not limited thereto.

Whether each of the plurality of output regions is used may be determined according to the characteristics of information to be output or an event. For example, the edge regions 510 and 550 may be appropriate for displaying a rear-side image of the vehicle, and the driver seat front region 520 may be appropriate for displaying information (e.g., navigation information, or forward obstacle information) required by a driver. In addition, the front passenger seat front region 540 may be appropriate for displaying content displayed to a passenger who sits on a front passenger seat, and the central region 530 may be appropriate for displaying information that is commonly applied both to a driver and to a passenger who sits on a front passenger seat, or information to be checked from the outside of the vehicle when stopped.

An image may be also displayed only on any one of the plurality of output regions, and in the case of a configuration of the projector unit 110 illustrated in FIGS. 4 (*c*) and 4 (*d*), different images may be simultaneously output in two or more regions.

Figure 6:
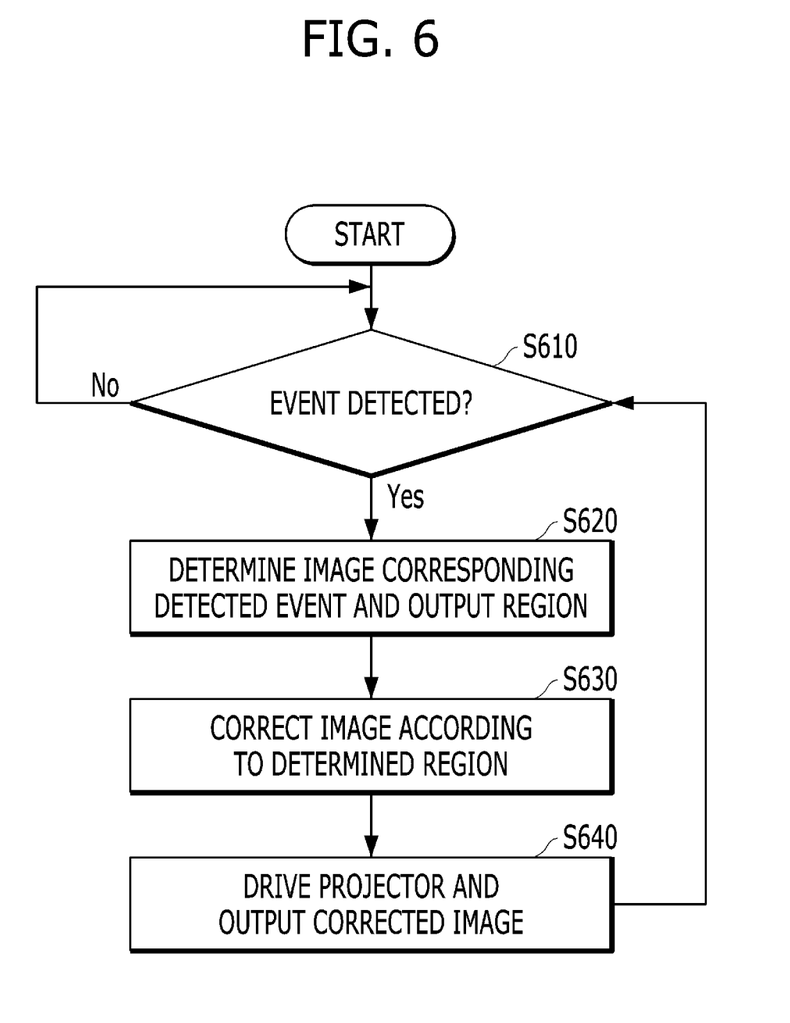
FIG. 6 is a flowchart showing an example of a method of controlling an AVN system according to an embodiment of the present disclosure.

FIG. 6 is a flowchart showing an example of a method of controlling an AVN system according to an embodiment of the present disclosure.

Referring to FIG. 6, first, an event corresponding to an initiation condition for beginning of image projection through the projector unit 110 or a change condition for changing the projected image may be detected (S610). The event detection may be based on information received through the communication unit 130, or may also be based on a user command detected through the detection/input unit 140.

As the event is detected (YES at S610), the controller may determine an image corresponding to the detected event, and in particular, the output region determination unit 122 may determine an output region of the determined region (S620). An image and an output region according to a detailed type of a event will be described below in more detail.

The screen correction unit may perform image correction according to the determined output region (S630).

Then, the projector unit 110 may be driven to output a corrected image (S640). For example, the projector output unit 111 may output the corrected image, and the projector driver 112 may control a direction in which the projector output unit 111 is directed in such a way that the image output from the projector output unit 111 is projected to the determined output region.

Event detection may be performed again after an image is output or is being output, and a procedure of outputting an image may be repeatedly performed according to whether an event occurs.

Hereinafter, with reference to FIG. 7, an image corresponding to an event and an output region will be described in detail.

Figure 7:
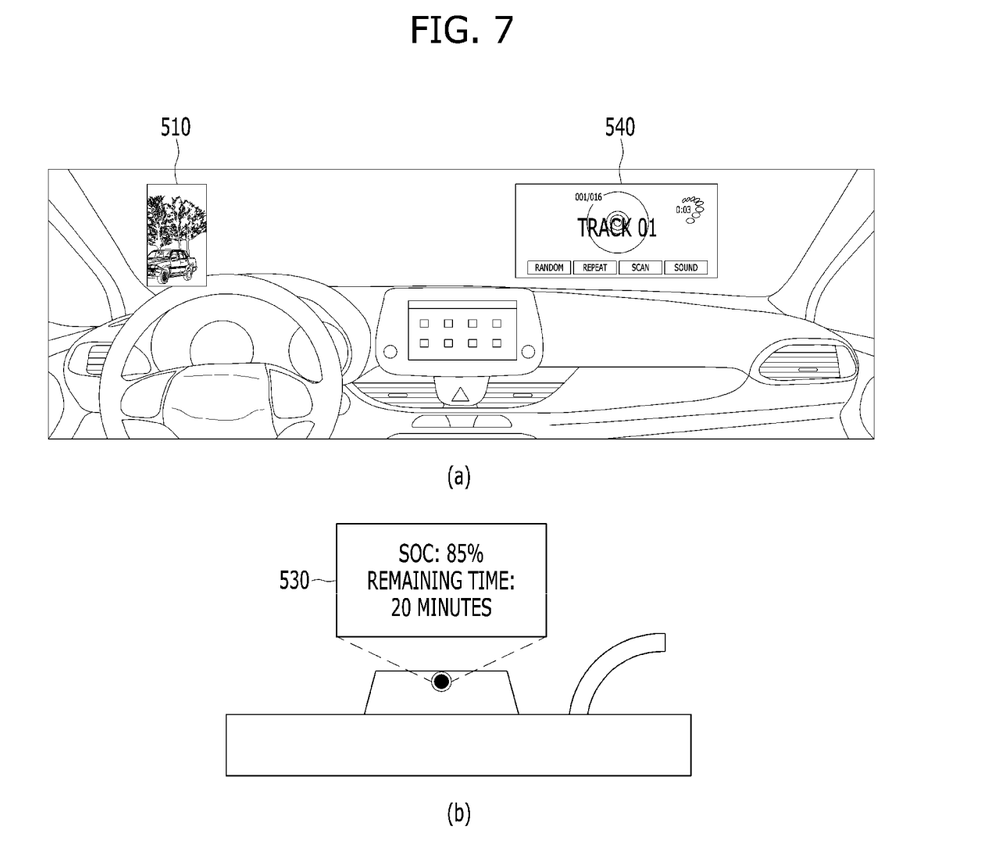
FIG. 7 is a diagram for explanation of a detailed form of information displayed through a projector of an AVN system according to an embodiment of the present disclosure.

FIG. 7 is a diagram for explanation of a detailed form of information displayed through a projector of an AVN system according to an embodiment of the present disclosure.

First, referring to FIG. 7 (*a*), when a driver turns on a left turn signal lamp or opens a door at a driver seat when stopped, as examples of events, a rear-left image may be projected onto the driver seat edge region 510. In addition, when a passenger who sits on a front passenger seat intends to perform multimedia control, as examples of events, an image including a user interface for multimedia control may be projected onto the front of the front passenger seat.

In another example, referring to FIG. 7 (*b*), when a vehicle is a plug-in hybrid electric vehicle (PHEV) or an electric vehicle (EV), a battery of which is chargeable through external power, as charging is performed in a situation in which a passenger is not present in the vehicle, an image including charging state information may be projected onto the central region 530 in order to enable the charging state to be checked from the outside of the vehicle.

In addition, an image mapped to information on a moving object detected on the other side of the windshield may be dynamically projected by an ADAS apparatus, and thus a safe-driving assistance function may be performed. In another example, as shown in FIGS. 4 (c) and 4 (d), when there are a plurality of image projection devices, even if alert information is output on a display or a cluster of an AVN system in the case of autonomous driving, a driver may easily miss the information, and thus one image projection device may project alert information on the windshield for a passenger, and another image projection device may project alert information in a different form to allow a pedestrian to see the information. In addition, when it is possible to rotate a seat in the case of autonomous driving, the output region may also be changed to correspond to a rotation direction.

The embodiments that have been described thus far may have the following advantages.

A general head-up display (HUD) or a general projector for windshield projection is positioned on a dashboard, and thus there may be various limitations in terms of a dashboard package, but according to an embodiment, a projector unit uses a rear surface of an AVN system, but not a dashboard, and thus it enables free design of a dashboard package.

When information (e.g., turn-by-turn guidance of navigation) acquired by an AVN system is used, if a projector unit is installed on a dashboard, the AVN system and the projector unit need to use a separate wired cable or a wireless interface, but according to the present embodiment, a projector unit may be installed in the AVN system, and thus a separate communication interface may not be required. As such, reduction in manufacturing costs may be expected.

When a proximity sensor is disposed in the detection/input unit 140 of the AVN system 100, a screen projected onto the windshield may be intuitively controlled.

In addition, even if a display for a camera monitor system (CMS) is not provided in the vicinity of an A-pillar, a side image corresponding to a specific direction may be projected, and thus, a CMS function may also be performed.

An in-vehicle information display apparatus related to at least one embodiment of the present disclosure configured as described above may display various pieces of information on a windshield through a projector of a rear surface thereof.

In particular, the projector is installed in a protrusion type information display apparatus, and thus a separate communication device between apparatuses may not be required, and it may be possible to change a position at which information is displayed, through a driver.

In addition, correction based on curves of a windshield or a relative direction and distance with a projector may be performed according to the position at which information is displayed, and thus an undistorted image may be output onto the windshield.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A method of controlling an in-vehicle information display apparatus, the method comprising:
    upon detecting that an event occurs, determining an image corresponding to the event and an output region, by a controller, among a plurality of regions of a windshield;
    correcting, by the controller, the determined image to match the determined output region; and
    projecting the corrected image onto the determined output region through a projection unit disposed on a rear surface opposite to a front surface on which a display of a protrusion type information display apparatus is disposed.

2. The method of claim 1, wherein the projector unit includes:
    at least one image projection device; and
    a projector driver configured to rotate at least some of the at least one image projection device along at least one axis.

3. The method of claim 2, wherein projecting the corrected image includes controlling the projector driver to rotate an image projection device corresponding to the determined output region toward the determined output region among the at least one image projection device.

4. The method of claim 2, wherein correcting the determined image is performed in consideration of at least one of curves of the output region of the windshield, or an angle or a distance between the output region and the image projection device.

5. The method of claim 2, wherein correcting the determined image is performed with reference to a table provided with respect to a plurality of preset output regions.

6. The method of claim 2, wherein the at least one image projection device includes a plurality of image projection devices; and
    wherein the projector driver is disposed in each of the plurality of image projection devices.

7. The method of claim 6, wherein horizontal angles at which the image projection devices are respectively directed are different from each other; and
    wherein the projector driver independently rotates the plurality of image projection devices in at least a vertical direction.

8. A non-transitory computer readable recording medium containing program instructions executed by a processor, the computer readable medium comprising:
    program instructions that, upon detecting that an event occurs, determine an image corresponding to the event and an output region, among a plurality of regions of a windshield;
    program instructions that correct the determined image to match the determined output region; and
    program instructions that project the corrected image onto the determined output region through a projection unit disposed on a rear surface opposite to a front surface on which a display of a protrusion type information display apparatus is disposed.

9. A protrusion type information display apparatus applied to a vehicle, comprising:
- an output region determination unit configured to, upon detecting that an event occurs, determine an image corresponding to the event and an output region, among a plurality of regions of a windshield;
- a screen correction unit configured to correct the determined image to match the determined output region; and
- a projector unit disposed on a rear surface opposite to a front surface on which a display is disposed and configured to project the corrected image onto the determined output region.

10. The apparatus of claim 9, wherein the projector unit includes:
- at least one image projection device; and
- a projector driver configured to rotate at least some of the at least one image projection device along at least one axis.

11. The apparatus of claim 10, wherein the projector driver rotates an image projection device corresponding to the determined output region toward the determined output region among the at least one image projection device.

12. The apparatus of claim 10, wherein the screen correction unit performs correction in consideration of at least one of curves of the output region of the windshield, or an angle or a distance between the output region and the image projection device.

13. The apparatus of claim 10, wherein the screen correction unit performs correction with reference to a table provided with respect to a plurality of preset output regions.

14. The apparatus of claim 13, wherein horizontal angles at which the image projection devices are respectively directed are different from each other; and
- wherein the projector driver independently rotates the plurality of image projection devices in at least a vertical direction.

15. The apparatus of claim 10, wherein the at least one image projection device includes a plurality of image projection devices; and
- wherein the projector driver is disposed in each of the plurality of image projection devices.

* * * * *